(12) United States Patent
Lucas et al.

(10) Patent No.: US 8,272,685 B2
(45) Date of Patent: Sep. 25, 2012

(54) VEHICLE SEAT WITH AIR DUCT

(75) Inventors: Marc Jonathon Lucas, Novi, MI (US); Louis Paspal, Canton, MI (US); Neil Robert Burrows, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 12/702,835

(22) Filed: Feb. 9, 2010

(65) Prior Publication Data
US 2011/0163580 A1 Jul. 7, 2011

(51) Int. Cl.
*A47C 31/00* (2006.01)

(52) U.S. Cl. ........... 297/180.1; 297/180.12; 297/180.13; 297/180.14; 180/68.1; 180/68.5; 296/208

(58) Field of Classification Search ............... 297/180.1, 297/180.12–180.14; 180/68.1, 68.5; 296/208
See application file for complete search history.

(56) References Cited

U.S. PATENT DOCUMENTS

| | | | |
|---|---|---|---|
| 5,372,402 A * | 12/1994 | Kuo | 297/180.13 |
| 5,626,386 A * | 5/1997 | Lush | 297/180.13 |
| 6,220,383 B1 * | 4/2001 | Muraki et al. | 180/68.5 |
| 6,224,150 B1 * | 5/2001 | Eksin et al. | 297/180.1 |
| 6,478,369 B1 * | 11/2002 | Aoki et al. | 297/180.13 |
| 6,682,140 B2 * | 1/2004 | Minuth et al. | 297/180.14 |
| 6,750,630 B2 | 6/2004 | Inoue et al. | |
| 6,976,734 B2 * | 12/2005 | Stoewe | 297/180.14 |
| 7,029,065 B2 * | 4/2006 | Laib | 297/180.13 |
| 7,048,321 B2 | 5/2006 | Bandoh et al. | |
| 7,240,752 B2 * | 7/2007 | Takahashi et al. | 180/68.1 |
| 7,396,075 B2 * | 7/2008 | Ohkuma et al. | 297/180.1 |
| 7,419,209 B1 * | 9/2008 | Mangiapane et al. | 296/208 |
| 7,621,594 B2 * | 11/2009 | Hartmann et al. | 297/180.12 |
| 7,625,039 B2 * | 12/2009 | Mangiapane et al. | 296/208 |
| 7,637,335 B2 * | 12/2009 | Hayashi | 180/68.5 |
| 7,688,582 B2 * | 3/2010 | Fukazu et al. | 361/690 |
| 7,828,050 B2 * | 11/2010 | Esaki | 165/202 |
| 7,905,307 B2 * | 3/2011 | Kubota et al. | 180/68.1 |
| 8,034,473 B2 * | 10/2011 | Takei | 429/120 |
| 2001/0026887 A1 | 10/2001 | Minamiura et al. | |
| 2003/0186115 A1 * | 10/2003 | Shibasawa et al. | 429/100 |
| 2005/0011692 A1 * | 1/2005 | Takahashi et al. | 180/68.5 |
| 2008/0196957 A1 | 8/2008 | Koike et al. | |

FOREIGN PATENT DOCUMENTS

| | | |
|---|---|---|
| JP | 2006335244 A | 12/2006 |
| JP | 2007331689 A | 12/2007 |
| JP | 2009012606 A | 1/2009 |

* cited by examiner

*Primary Examiner* — Laurie Cranmer
(74) *Attorney, Agent, or Firm* — David B. Kelley; Brooks Kushman P.C.

(57) ABSTRACT

An automotive vehicle seat back adapted for movement between an upright position and a lowered position has an air duct with an intake located adjacent an upper portion of the seat back and an outlet located adjacent a lower portion of the seat back. The air duct takes in ambient cabin air at its upper end and that air is directed to an electronics compartment located behind the seat in order to cool the electronics regardless of whether the seat back is in the raised or the lowered position.

10 Claims, 3 Drawing Sheets

VEHICLE SEAT WITH AIR DUCT

BACKGROUND

1. Technical Field

The present invention relates generally to automotive vehicles having electronics devices needing a supply of cooling air, and more specifically to a seat having an air duct for supplying cooling air from the passenger cabin to such devices located in a compartment adjacent the seat.

2. Background Art

Some electrically powered vehicles have batteries and/or other electronic components located in the vicinity of the passenger or cargo compartments. Such devices may, for example, be in a compartment located beneath a seat, below the passenger or cargo compartment floor, and/or behind one of the seats. Such electronic components typically generate heat during operation and so may require some degree of active cooling. This cooling may, in most cases, be achieved by ensuring a relatively constant flow of ambient air from within the vehicle cabin.

In some vehicles, it is difficult to efficiently package the required cooling air ducts due to space constraints. This is particularly prevalent in smaller vehicles, where packaging space is at a premium. Known locations for air ducts, such as behind interior trim panels or below the cabin floor, may consume an unacceptable amount of passenger and/or cargo space within the cabin.

Further complicating this design problem is the fact that many vehicles have reconfigurable interiors. For example, it is common for one or more of the seats in the cabin to fold down from their upright, seating position to provide a generally horizontal load floor and thereby maximize usable cargo volume and/or accommodation flexibility.

SUMMARY

According to the disclosed embodiments of the present invention, an automotive vehicle seat back adapted for movement between an upright position and a lowered position comprises an air duct having an intake located adjacent an upper portion of the seat back and an outlet located adjacent a lower portion of the seat back. The air duct takes in ambient cabin air at its upper end and that air is directed to an electronics compartment located adjacent the seat in order to cool electronic devices in the compartment.

In a first embodiment of the invention, a flexible hose is connected to the air duct outlet and to the electronics compartment. The flexible hose maintains the cooling air connection over the full range of motion of the seat back between the upright position and the lowered position. The hose also maintains air flow during fore-and-aft movement of the seat.

In another embodiment of the invention, a plenum is disposed adjacent the lower portion of the seat back and is in fluid communication with the air duct outlet when the seat back is in either the upright position or the lowered position.

In another embodiment of the invention, a lower air duct has an end fitting that engages with an end fitting of the air duct, the engagement providing pivoting movement of the air duct relative to the lower air duct when the seat back is moved between the upright position and the lowered position. The lower air duct communicates with the electronics compartment.

Other features and advantages of the present invention will be readily appreciated, as the same becomes better understood after reading the subsequent description taken in conjunction with the accompanying drawings.

BRIEF DESCRIPTION OF THE DRAWINGS

Embodiments of the present invention will now be described by way of example only with reference to the accompanying drawings in which.

DETAILED DESCRIPTION

Figure 1:
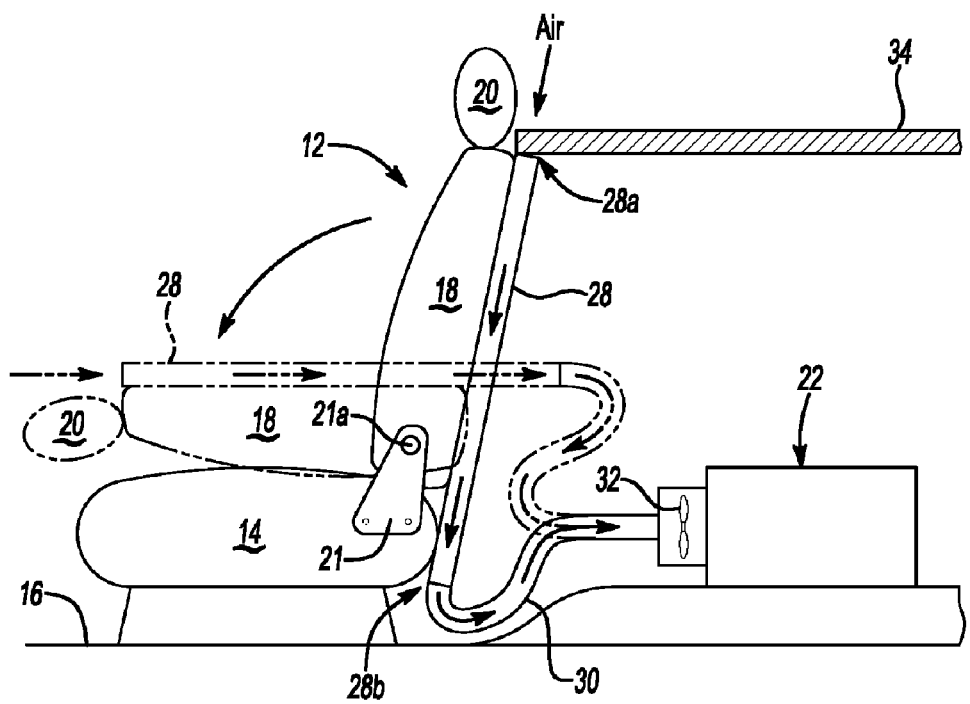
FIG. 1 is a simplified diagram of a vehicle seat and air duct according to a first embodiment of the present invention.

Referring to FIG. 1, a vehicle cabin includes a seat 12 having a seat cushion 14 disposed generally horizontally adjacent a floor 16 and a seat back 18 movable between a generally vertical upright position (indicated in solid lines) and a lowered, stowed position (indicated in phantom lines). For simplicity of description, only one seat is shown, but the present invention is equally applicable to a vehicle having any number of seats and/or seating rows.

Seat 12 may be a bench seat 12 extending across the width of the vehicle, a split bench, a bucket seat, a pedestal-mounted chair ("captain's chair"), or any other type of seat that may feature a folding seat back. Seat 12 may include a headrest 20 at the upper end of seat back 18, the headrest 20 being unitary with the seat back 18 or movable with respect to the seat back 18. Seat 12 may be mounted for fore-and-aft movement relative to vehicle floor, as is well known in the vehicle interiors art.

Seat back 18 and seat cushion 14 may be connected by a simple hinge-type folding mechanism 21 that defines a pivot axis 21a. It is also possible for the moment of seat back 18 to include a more complex, multi-axis mechanism and/or a powered drive (not shown), as is well known in the automotive vehicle interiors art.

An electronics compartment 22 is located immediately behind seat 12 and may contain electric/electronic components that require cooling for proper performance. Examples of such electric/electronic components may include, but are not limited to, batteries, battery chargers, DC/DC, AC/DC or DC/AC converters, and inverters. Electronics compartment 22 is shown located on top of a floor behind the seat 12 for clarity or illustration, but may alternatively be partially or completely below the floor, and/or partially or completely beneath the seat, as determined by interior layout and packaging constraints.

Seat back 18 includes an air duct 28 extending between an intake 28a adjacent to the upper end of the seat back 18 and an outlet 28b adjacent to the lower end of the seat back 18. The terms "upper" and "lower" as used in this regard refer to the upright, generally vertical orientation of the seat back 18 as it is shown in FIG. 1. Air duct 28 is shown in FIG. 1 to be attached to a rear surface of seat back 18, but the duct may also be enclosed by or "buried" within the seat back so that the duct does not protrude from the rear surface.

Air duct 28 may extend over the entire width of seat back 18 or only some portion of the width, depending upon the available space for the duct and the necessary volume of air flow. For example, if interior packaging constraints allow a relatively small depth of the air duct (depth being measured generally perpendicular to the rear surface of seat back 18), then the duct may be relatively wide and extend across a large portion of the width of the seat back 18 in order to achieve the required cross-sectional area.

A flexible hose 30 connects to the air duct outlet 28b and to the compartment 22 so that duct intake 28a is in fluid communication with the compartment. A fan 32 may be located adjacent the downstream end of hose 30, as shown, or at any other location in the air flow path to provide pressure ensuring a flow of cooling air to compartment 22.

Hose 30 is sufficiently long and flexible such that when seat back 18 is moved from the upright position to the stowed position the hose bends as necessary to provide an unobstructed flow of air to compartment 22. Hose 30 is also sufficiently long and flexible to maintain the required air flow if seat 12 is moved fore-and-aft, if such adjustment is provided.

When seat back 18 is in the upright position, a fixed or removable horizontal shelf 34 may be located immediately behind the upper end of the seat back 18. If this is the case, shelf 34 may have openings, such as louvers or vent holes (not shown), at appropriate locations to allow air flow into duct intake 28a.

When seat back 18 is in the lowered position, duct intake 28a is positioned so that it is unlikely to be obstructed by any objects that may be loaded on top of the generally horizontal rear surface of the seat back 18. In many vehicles, heating/air conditioning vents (not shown) are located in the passenger compartment such that they will blow air toward the duct intake 28a when in the lowered position, thereby improving the cooling efficiency provided by the air duct 28.

Figure 2:
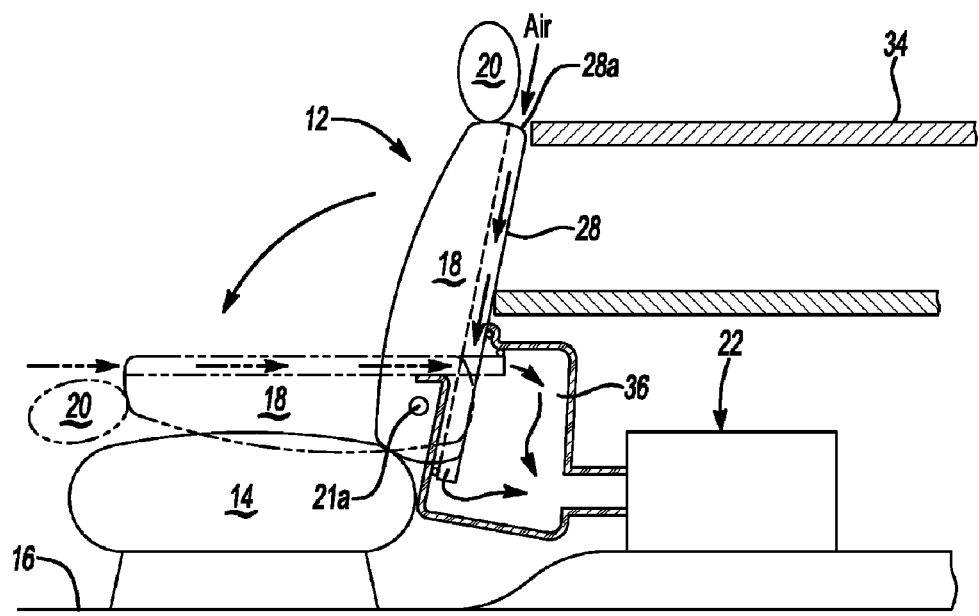
FIG. 2 is a simplified diagram of a vehicle seat and air duct according to a second embodiment of the present invention.

Referring now to FIG. 2, a seat 12 is of similar configuration to that shown in FIG. 1, with similar components being identified by the same reference numerals as in FIG. 1. In this embodiment of the invention, a plenum 36 is located immediately behind the lower portion of seat back 18 and feeds cooling air to the compartment 22.

Plenum 36 is configured so that air duct 28 outlet 28b is in fluid communication with the plenum 36 when seat back 18 in either the upright or the lowered position. When seat back 18 is in the upright position (as shown solid lines in FIG. 2), portions of air duct 28 and/or seat back 18 make contact with a first set of seals located adjacent an upper lip of plenum 36 and adjacent a lower lip of the plenum 36. First seals are located and configured to provide a substantially air-tight seal between the seat back 18/air duct 28 and may be attached to plenum 36, air duct 28/seat back 18, or both as may be required for sealing effectiveness and/or manufacturability.

When seat back 18 is in the lowered position (as shown phantom lines), portions of air duct 28 and/or seat back 18 make sealing contact with a second set of seals located between the seat back 18/air duct 28 and the plenum 36 as necessary to provide a substantially air-tight seal. First and second seals may be made of an appropriate elastically deformable material such as, for example, flexible PVC, EPDM sponge rubber, natural rubber, etc. Seals may, for example be simple compression seals and/or movable, flap-type seals.

Figure 3:
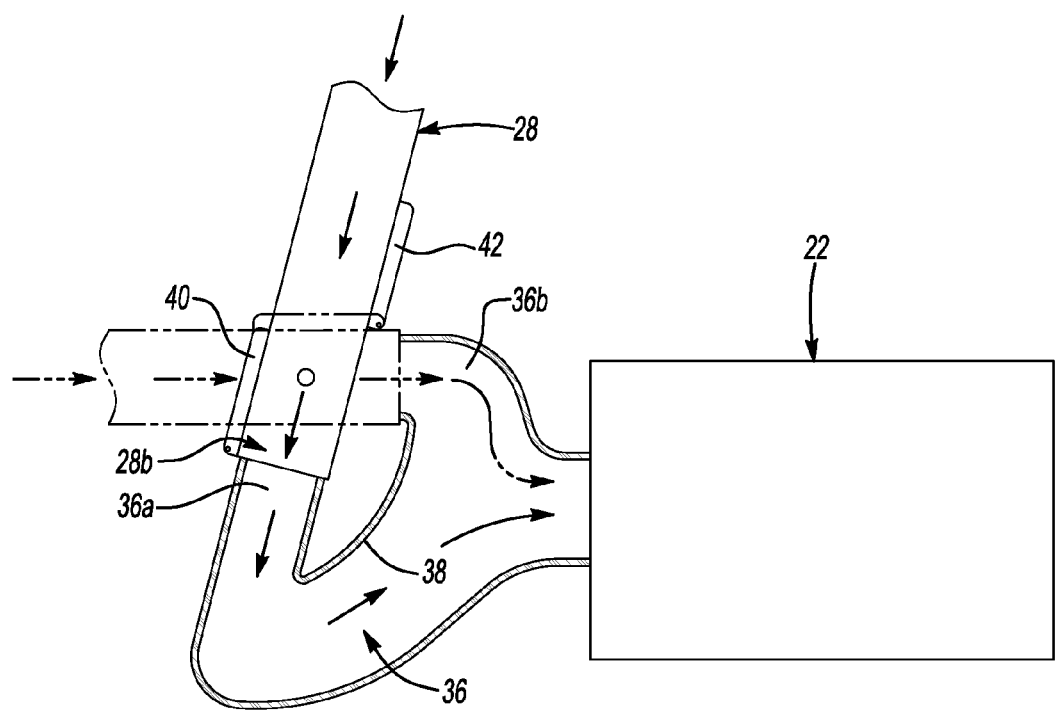
FIG. 3 is a simplified detail view of a vehicle seat and air duct according to a third embodiment of the present invention.

FIG. 3 depicts an alternative embodiment of a plenum 36 having an intermediate wall 38 that divides the plenum 36 into a lower flow path 36a when the seat back 18 is in the upright and an upper flow path 36b when the seat back 18 is in the lowered position. When seat back 18 is in the upright position (as shown in solid lines) air duct outlet 28b opens generally downward and connects with the lower flow path 36a into the plenum 36. In this position, the rear surface of air duct 28/seat back 18 blocks off an upper air flow path 36b into the plenum 36. When seat back 18 is in the lowered position (as shown in phantom lines) air duct outlet 28b opens generally rearward and connects with the upper flow path 36b. Flap-type seals 40, 42 may be used to aid in blocking the unused upper and/or lower flow paths.

Figure 4:
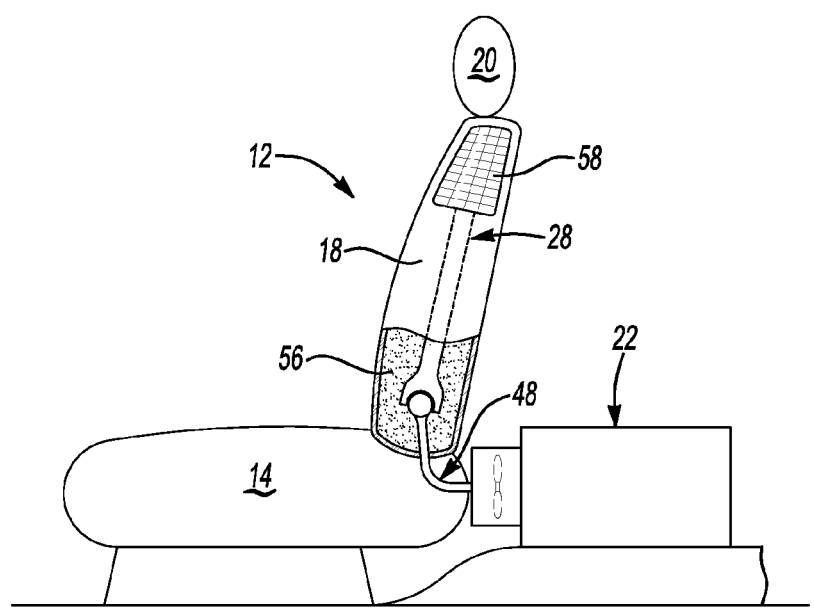
FIG. 4 is a simplified diagram of a vehicle seat and air duct according to a fourth embodiment of the present invention.
Figure 5:
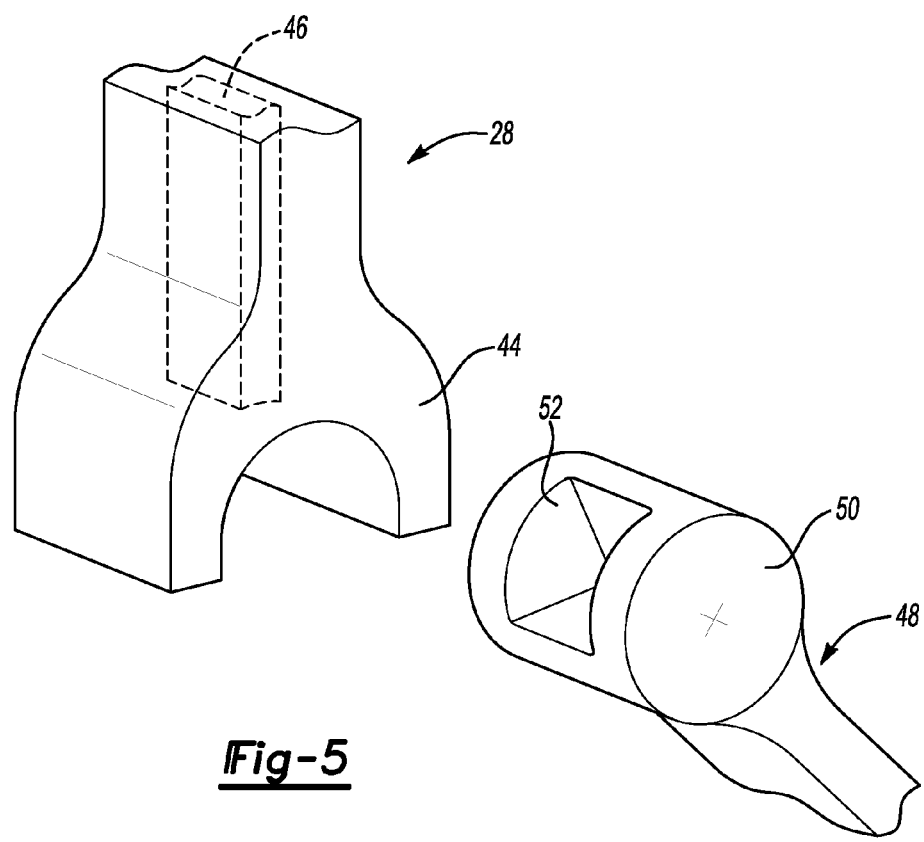
FIG. 5 is an exploded detail view of components of the embodiment depicted in FIG. 4.
Figure 6:
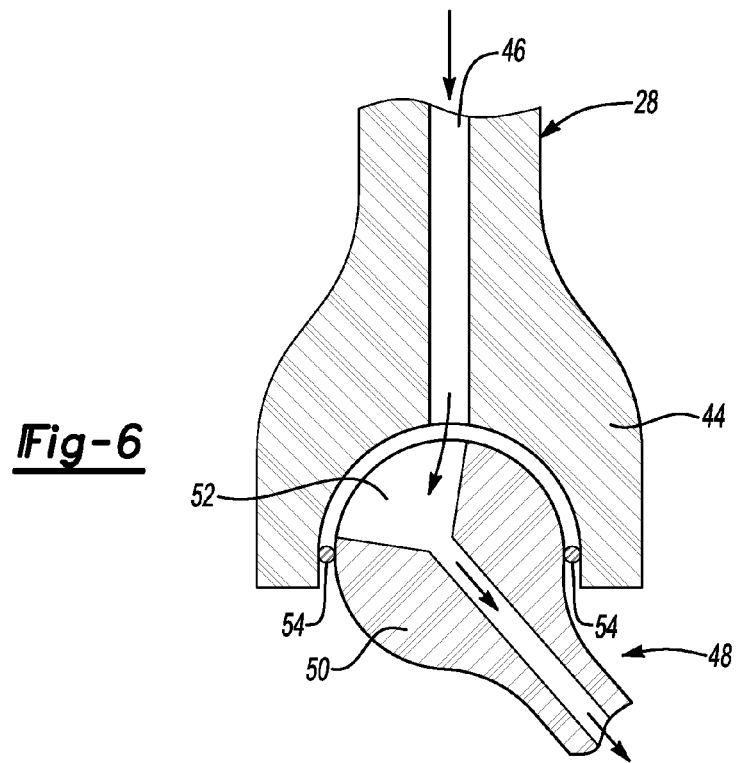
FIG. 6 is a cross-sectional view of the components shown in FIG. 5.

In a further embodiment illustrated in FIGS. 4-6, seat back 18 includes an air duct 28 having a fitting 44 at its lower end that connects with a mating fitting 50 of a lower air duct 48. Engagement between fitting 44 and mating fitting 50 permits rotating movement of air duct 28 relative to lower air duct 48 as seat back 18 is moved between the raised and lowered positions, and maintains fluid communication between the two ducts throughout the range of movement. In the depicted embodiment, fitting 44 is U-shaped and mating fitting 50 is cylindrical, but the fittings may be of any mating geometry that maintains air flow through the ducts while permitting folding of seat back 18. Seals 54 may be provided in the fittings as necessary to maintain a substantially air-tight fit between the components.

Air duct 28 may serve as part of a rigid frame of seat back 18 and/or may be embedded in foam 56 or other cushioning material as seen in FIG. 4. At least a portion of lower air duct 48 may be hidden or buried within seat back 18 and/or seat cushion 14, and the rearmost end of the lower air duct 48 connects with compartment 22 so that cooling air is supplied to the compartment whether the seat back 18 is in the raised or lowered position.

As is also shown in the FIG. 4 embodiment, air duct 28 receives cabin air through an opening 58 located on a side surface of seat back 18. A grille or other air-permeable panel may cover the opening. A side-located air duct intake opening 58 may be appropriate for use when there is cabin structure that may obstruct air flow, such as, for example, an adjacent seat or interior side wall (not shown).

The present invention has been described in an illustrative manner. It is to be understood that the terminology used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An automotive vehicle seat back adapted for movement between an upright position and a lowered position and comprising:
    an air duct having an intake located adjacent an upper portion of the seat back and an outlet located adjacent a lower portion of the seat back; and
    a lower air duct having a first fitting engaged with a second fitting of the air duct, the engagement providing pivoting movement of the air duct relative to the lower air duct when the seat back is moved between the upright position and the lowered position.

2. The apparatus according to claim 1 wherein the lower air duct is contained at least partially within a seat cushion, the seat back being movable relative to the seat cushion between the upright and lowered positions.

3. The apparatus according to claim 1 wherein the seat back pivots between the upright position and the lowered position about a pivot axis located adjacent the lower portion of the seat back.

4. The apparatus according to claim 1 wherein the air duct intake comprises an opening in a side surface of the seat back.

5. An automotive vehicle seat back movable between an upright position and a lowered position, comprising:
- an air duct having an intake located adjacent an upper portion of the seat back and an outlet located adjacent a lower portion of the seat back; and
- a plenum disposed adjacent the seat back lower portion and in fluid communication with the air duct outlet when the seat back is in either the upright or the lowered position.

6. The apparatus according to claim 5 wherein the seat back is movable with respect to a seat cushion, and the plenum is located adjacent a pivoting junction between the seat back and the seat cushion.

7. An automotive vehicle seat back adapted for movement between an upright position and a lowered position and comprising an air duct having an intake located adjacent an upper portion of the seat back and an outlet located adjacent a lower portion of the seat back, the air duct intake having an opening in a side surface of the seat back.

8. The apparatus according to claim 7 wherein the seat back pivots between the upright position and the lowered position about a pivot axis located adjacent the lower portion of the seat back.

9. Apparatus for an automotive vehicle comprising:
- a seat having a seat cushion and a seat back movable relative to the seat cushion between an upright position and a lowered position;
- an electronics compartment rearward of the seat; and
- an air duct extending along a rear surface of the seat back and movable along with the seat back between the upright position and the lowered position, the air duct having an intake adjacent an upper rear portion of the seat back and an outlet adjacent a lower rear portion of the seat back, the outlet in fluid communication with the electronics compartment.

10. The apparatus according to claim 9 further comprising a flexible hose extending between the air duct outlet and the electronics compartment.

* * * * *